(12) United States Patent
Drapeau (10) Patent No.: US 7,272,002 B2
(45) Date of Patent: Sep. 18, 2007

(54) AUXILIARY COOLING METHODS AND SYSTEMS FOR ELECTRICAL DEVICE HOUSINGS

(75) Inventor: Richard J. Drapeau, Victoria, MN (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 21 days.

(21) Appl. No.: 11/280,366

(22) Filed: Nov. 16, 2005

(65) Prior Publication Data

US 2007/0109740 A1 May 17, 2007

(51) Int. Cl.
  *G06F 1/16* (2006.01)
(52) U.S. Cl. ............... 361/687; 361/695; 710/2; 257/715
(58) Field of Classification Search ........ 361/695–861, 361/724–727, 679–687; 710/2; 257/714–715, 257/721–722; 174/15.1, 15.2, 16.1, 16.3
See application file for complete search history.

(56) References Cited

U.S. PATENT DOCUMENTS 5,680,294 A * 10/1997 Stora et al. ............... 361/695
6,748,458 B2 * 6/2004 Andrewartha et al. ......... 710/2
2005/0162830 A1 * 7/2005 Wortman et al. ........... 361/695
2006/0044756 A1 * 3/2006 Wong ..................... 361/695
2006/0092611 A1 * 5/2006 Beihoff et al. ............. 361/698

* cited by examiner

*Primary Examiner*—Hung Van Duong
(74) *Attorney, Agent, or Firm*—Fogg & Powers LLC; J. Patrick Kendrick (57) ABSTRACT

Methods and systems for auxiliary cooling of electrical device housings are provided. In one embodiment, an electronics device enclosure system is provided. The system comprises a housing, wherein the housing encloses one or more electronic devices; a backplane situated within the housing wherein at least one of the one or more electronic devices are coupled to the backplane; and an auxiliary cooling system coupled to the backplane and adapted to receive electrical power from one or more power sources, wherein the auxiliary cooling system comprises one or both of a thermoelectric cooling module and a fan, and wherein the auxiliary cooling system is adapted to increase the heat transfer from the one or more electronic devices to an environment external to the housing.

31 Claims, 10 Drawing Sheets

AUXILIARY COOLING METHODS AND SYSTEMS FOR ELECTRICAL DEVICE HOUSINGS

TECHNICAL FIELD

The present invention generally relates to the field of telecommunications, and, in particular, to auxiliary cooling methods and systems for electrical device housings.

BACKGROUND

Telecommunication housings shield, secure, and protect telecommunication network cables and electronic devices from their surroundings. The housings can also be subjected to partial or total submersion in water and are often required to be sealed against a pressure differential. These sealed housings are required to remove energy, usually in the form of heat, generated by the electronic equipment in the housings. Many enclosures trap heat generated by the electronics. The build up of heat within these enclosures can cause significant problems for the electronic equipment by challenging the temperature limits of the electronic devices and causing device failure.

In order to maintain internal housing temperatures within the temperature limits of the enclosed electronic devices, the housings and electronic devices are typically designed to dissipate heat through passive heat transfer paths. Under certain conditions, these passive heat transfer paths prove to be insufficient to maintain internal housing temperatures within temperature limits of the electronic devices. Possible causes for inadequate passive heat transfer paths include, but are not limited to, corrosion, fouling, solar loading, poor air flow, high ambient temperature, and electronic devices generating more heat than expected. In these conditions, additional heat removal capacity is required for the continued reliable operation of the electronic devices. One problem is that many of the housings that require additional heat removal have already been placed in remote locations with limited power options, or congested installation sites with limited space, and as such effective auxiliary cooling solutions are difficult to achieve. The need for a retrofitable solution is high.

For the reasons stated above and for other reasons stated below which will become apparent to those skilled in the art upon reading and understanding the specification, there is a need in the art for effective, low maintenance and low power auxiliary cooling methods and systems for electrical device housings.

SUMMARY

The Embodiments of the present invention provide methods and systems for auxiliary cooling for electrical device housings and will be understood by reading and studying the following specification.

In one embodiment, an electronics device enclosure system is provided. The system comprises a housing, wherein the housing encloses one or more electronic devices; a backplane situated within the housing wherein at least one of the one or more electronic devices are coupled to the backplane; and an auxiliary cooling system coupled to the backplane and adapted to receive electrical power from one or more power sources, wherein the auxiliary cooling system comprises one or both of a thermoelectric cooling module and a fan, and wherein the auxiliary cooling system is adapted to increase the heat transfer from the one or more electronic devices to an environment external to the housing.

In another embodiment, an auxiliary cooling system for a housing enclosing one or more electronic devices is provided. The system comprises a card adapted to couple with a backplane situated within the housing, wherein at least one of the one or more electronic devices are coupled to the backplane; and one or both of a thermoelectric cooling module and a fan, wherein one or both of the thermoelectric cooling module and the fan are adapted to receive electrical power from one or more power sources; wherein one or both of the thermoelectric cooling module and the fan are adapted to increase the heat transfer from the one or more electronic devices to an environment external to the housing.

In yet another embodiment, a method to provide auxiliary cooling to a housing enclosing one or more electronic devices is provided. The method comprises receiving power from one or more power sources with an auxiliary cooling system within a housing, wherein the housing encloses one or more electronic devices, and wherein the auxiliary cooling system comprises one or both of a fan and a thermoelectric cooling module; and operating one or both of the fan and the thermoelectric cooling module to transfer heat away from the one or more electronic devices.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Auxiliary cooling systems and methods provided by embodiments of the current invention are intended to actively augment existing passive repeater-cooling heat transfer paths for electronic equipment housings. Such auxiliary cooling systems and methods are deployed as needed in the field when existing passive heat transfer paths are found to be inadequate. In one or more embodiments, span power used to power electronic devices within the housing is also used to power the auxiliary cooling systems and methods of the present invention. Embodiments of the present invention do not take up valuable space in environments where space is significantly limited and allow for retrofit with current housings. In one embodiment, an auxiliary cooling system of one embodiment of the present invention is mounted internal to the electronics housing in a spare standard telecommunications repeater connector interface.

Figure 1A:
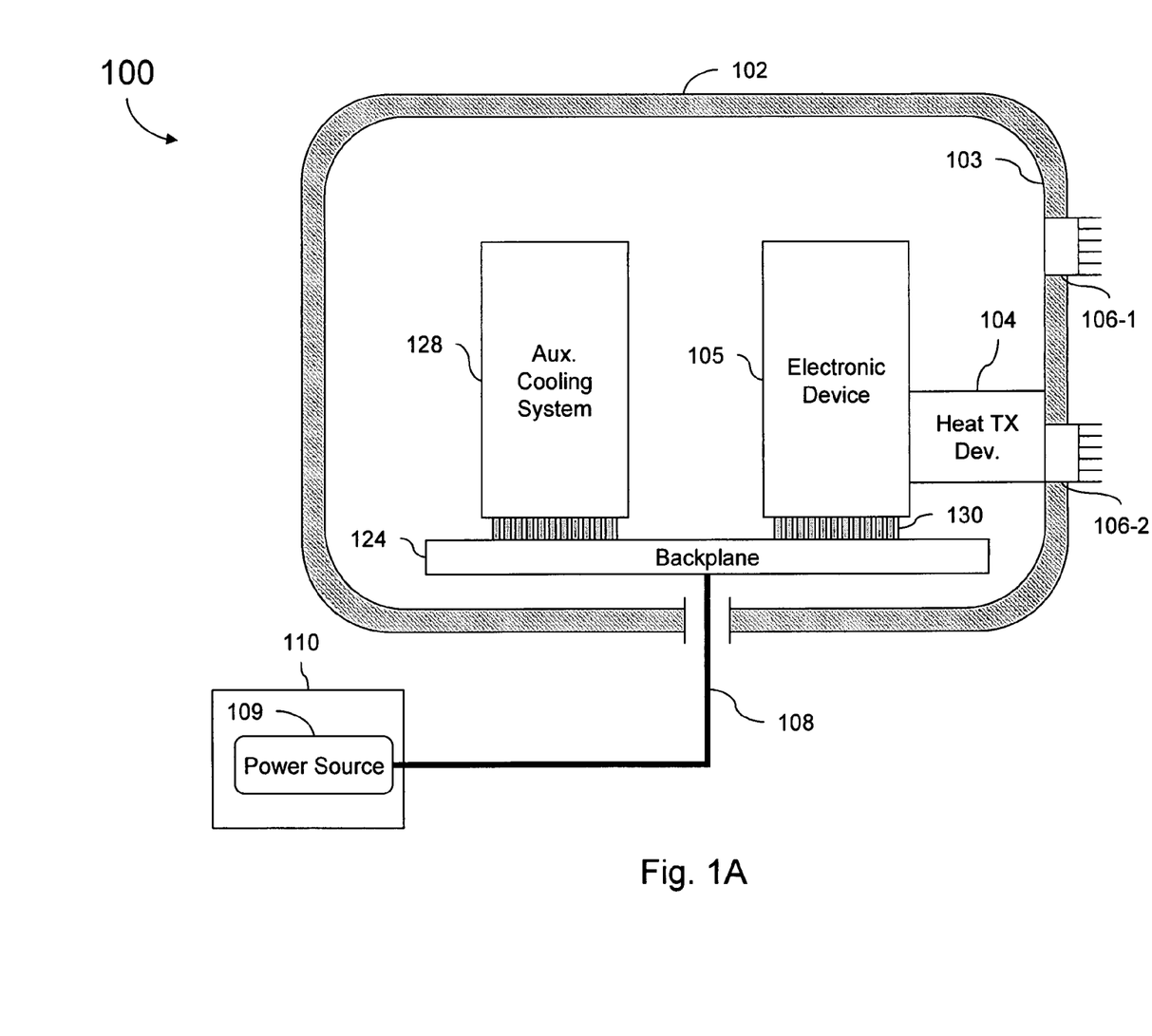
FIGS. 1A and 1B are illustrations of an auxiliary cooling system of one embodiment of the present invention.

FIG. 1A is an illustration of a first embodiment of an auxiliary cooling system generally shown at 100 according to the teachings of the present invention. System 100 includes a housing 102 for electronics equipment. In one embodiment, housing 102 is thermally conductive. In one embodiment, housing 102 is a metallic housing. Housing 102 includes one or more heat producing electronic devices 105. In one embodiment, electronic devices 105 are coupled to a backplane 124 via an edge connector 130. In one embodiment, power is remotely provided to housing 102. In alternate embodiments, power is provided to housing 102 over span cable 108 from a network node 110. In one embodiment, network node 110 is a central office, remote terminal, or the like. In one embodiment, electronic devices 105 are powered through backplane 124 via edge connector 130. In one embodiment, electronic devices 105 include one or more telecommunications repeater devices.

Passive heat transfer paths associated with housing 102 include convective, conductive and radiative heat transfer. For example convective heat transfer from the surface of electronic devices 105 to the air within housing 102, convective heat transfer between the air within housing 102 and an inside wall 103 of housing 102, and radiative heat transfer between electronic devices 105 and inside wall 103 of housing 102. In one embodiment, conductive heat transfer between electronic devices 105 and inside wall 103 of housing 102 is achieved through one or more passive heat transfer devices 104, such as, but not limited to thermally conductive structure, heat sinks, electronic retaining devices, cages and the like. In one embodiment, heat transfer device 104 comprises a cage into which one or more of electronic devices 105 are mounted. In one embodiment, heat transfer device 104 is part of the internal structure of housing 102. In one embodiment, heat transfer device 104 is any structure or component, either in direct or indirect contact with electronic devices 105, which is capable of transmitting heat away from electronic devices 105. Heat transferred to housing 102 then dissipates into the external environment.

In one embodiment, housing 102 further comprises one or more heat transfer paths such as heat transfer path 106-1 that transfers heat from the air within housing 102 to the external environment. In one embodiment, housing 102 includes one or more heat transfer paths such as heat transfer path 106-2 that transfers heat from one or more heat transfer devices, such as heat transfer device 104. In one embodiment, heat transfer paths 106-1 and 106-2 comprise a passive heat transfer devices such as but not limited to a heat sink that extends from the external environment through inside wall 103 of housing 102 and provides a heat transfer path for electronic devices such as electronic device 105. In one embodiment, heat transfer device 104 is coupled between electronic device 105 and a heat transfer path 106-2 and heat is transferred from electronic device 105 to heat transfer device 104 and then to heat transfer path 106-2 for further dissipation. In one embodiment, heat transfer path 106-2 is part of heat transfer device 104.

Embodiments of the present invention provide additional heat removing capacity for housing 102 by including one or more auxiliary cooling systems 128 within housing 102. Auxiliary cooling systems 128 provide for additional heat removing capacity by increasing one or more of the convective heat transfer from the surface of electronic devices 105 to the air within housing 102, the convective heat transfer between the air within housing 102 and the inside wall 103 of housing 102, and the conductive heat transfer between electronic devices 105 and inside wall 103 of housing 102 through passive heat transfer devices 104, as illustrated in FIGS. 2 through 5 below.

Figure 1B:
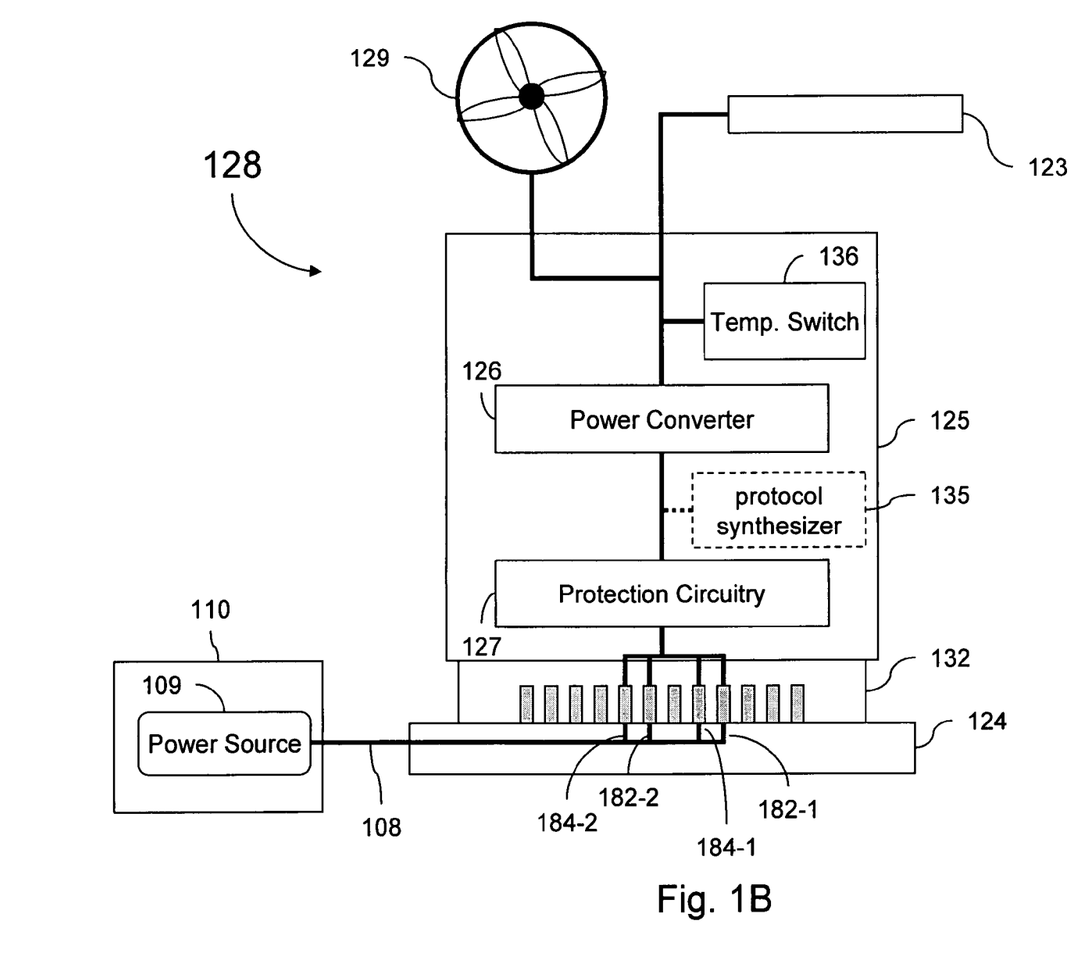

In one embodiment, illustrated in FIG. 1B, an auxiliary cooling system 128 comprises a card 125 coupled to backplane 124 via an edge connector 132. In one embodiment, auxiliary cooling system 128 has the same form factor as the one or more electronic devices 105. For example, in one embodiment, edge connector 132 is a connector of the type used to couple electronic devices 105 to backplane 124 and auxiliary cooling system 128 may be physically installed in housing 102 wherever electronic devices 105 can be installed. To provide the additional heat removing capacity for housing 102, in alternate embodiments, auxiliary cooling system 128 further comprises one or both of a fan 129 and a thermoelectric cooling module 123.

The number of auxiliary cooling systems 128 that can be installed within housing 102 is limited by the power available to operate one or both of fan 129 and thermoelectric cooling module 123. In one embodiment, in operation auxiliary cooling system 128 makes use of any one of many sources of electric power to operate. In certain cases, power is provided over span cable 108 from at least one power source 109, such as but not limited to one or more batteries, DC power supplies, or the like, at network node 110. In one embodiment, span cable 108 provides auxiliary cooling system 128 with power from at least two independent power sources. In one embodiment, auxiliary cooling system 128 is coupled to a source of electrical power via backplane 124.

In one embodiment, auxiliary cooling system 128 further includes one or more of protection circuitry 127 and DC-to-DC power converter 126. In one embodiment, protection circuitry 127 includes circuitry that provides protection for one or more of over current, over voltage, polarity reversal and the like. In one embodiment, DC/DC power converter 126 receives power from the at least one power source 109, through protection circuitry 127 over backplane 124. In one embodiment, DC/DC power converter 126 converts power from the at least one power source 109 into a voltage usable to operate one or both of a fan 129 and a thermoelectric cooling module 123.

In one embodiment, the operation of one or both of thermoelectric cooling module 123 and fan 129 is controlled by a temperature switch 136. Temperature switch 136 stops auxiliary cooling system 128 from cooling electronic devices 105 when the additional cooling capacity is not required. Besides conserving power, turning off thermoelectric cooling module 123 when additional cooling capacity is not required prevents the formation and accumulation of condensation within housing 102. In one embodiment, temperature switch 136 is a thermostat configured to apply potential to one or both of thermoelectric cooling module 123 and fan 129 based on the temperature within housing 102. In one embodiment temperature switch 136 turns one or both of thermoelectric cooling module 123 and fan 129 on when a temperature within housing 102 reaches a setpoint.

In one embodiment, auxiliary cooling system 128 further includes an optional protocol synthesizer 135. In operation, optional protocol synthesizer 135 mimics a remote repeater and permits the supply of power from network node 110 using any standard provisioning scheme. For example, in one embodiment, optional protocol synthesizer 135 is configured to appear to node 110 as an ADC SPX-HRPTSWD1 Single Wide 239 HDSL Slimline Repeater Unit or the like. In operation, optional protocol synthesizer 135 extracts power from span cable 108. In one embodiment, span cable 108 is provisioned for a standard central office powered service, such as POTS, ISDN, T1, HDSL, HDSL2, and the like. In one embodiment, 184-2 is a negative potential conductor of a primary provisioned twisted pair, sometimes called the ring conductor, and 182-2 is the return conductor of the primary provisioned twisted pair, sometimes called the tip conductor or battery return. Additional power can be obtained by the optional provisioning of additional twisted pairs, where, for example, 184-1 is the negative potential conductor of the secondary provisioned pair and 182-1 is the return conductor of the secondary provisioned pair. In one embodiment, edge connector 132 is a standard 12 pad connector with primary power provided on pads 5 and 6, and secondary power provided on pads 8 and 9. The advantage of this method is that it allows the operator to provision for auxiliary cooling system 128 on the central office side utilizing existing products and technology.

In one embodiment, optional protocol synthesizer 135 is configured to make auxiliary cooling system 128 appear to be a network repeater element for the provisioned protocol. In operation, optional protocol synthesizer 135 uses functionality that exists on network repeater units today to provide one or more of:

(1) support for embedded operations channels (EOC) for maintenance and provisioning purposes;
(2) support for a unique address for the auxiliary cooling system such that messages on the end-to-end EOC can be distinguished between any repeaters and the auxiliary cooling system;
(4) loop power through to a repeater or auxiliary cooling system further downstream;
(5) a DC continuity indication for shorts in the downstream span;
(6) power shut off when a non-compatible downstream component is recognized;
(7) support for disabling downstream loop power enabling when a fault is detected by the auxiliary cooling system and re-enabling downstream loop power enabling when the fault is cleared; and
(8) a tone-through feature to allow tracing through the auxiliary cooling system when the auxiliary cooling system is not powered.

Figure 2:
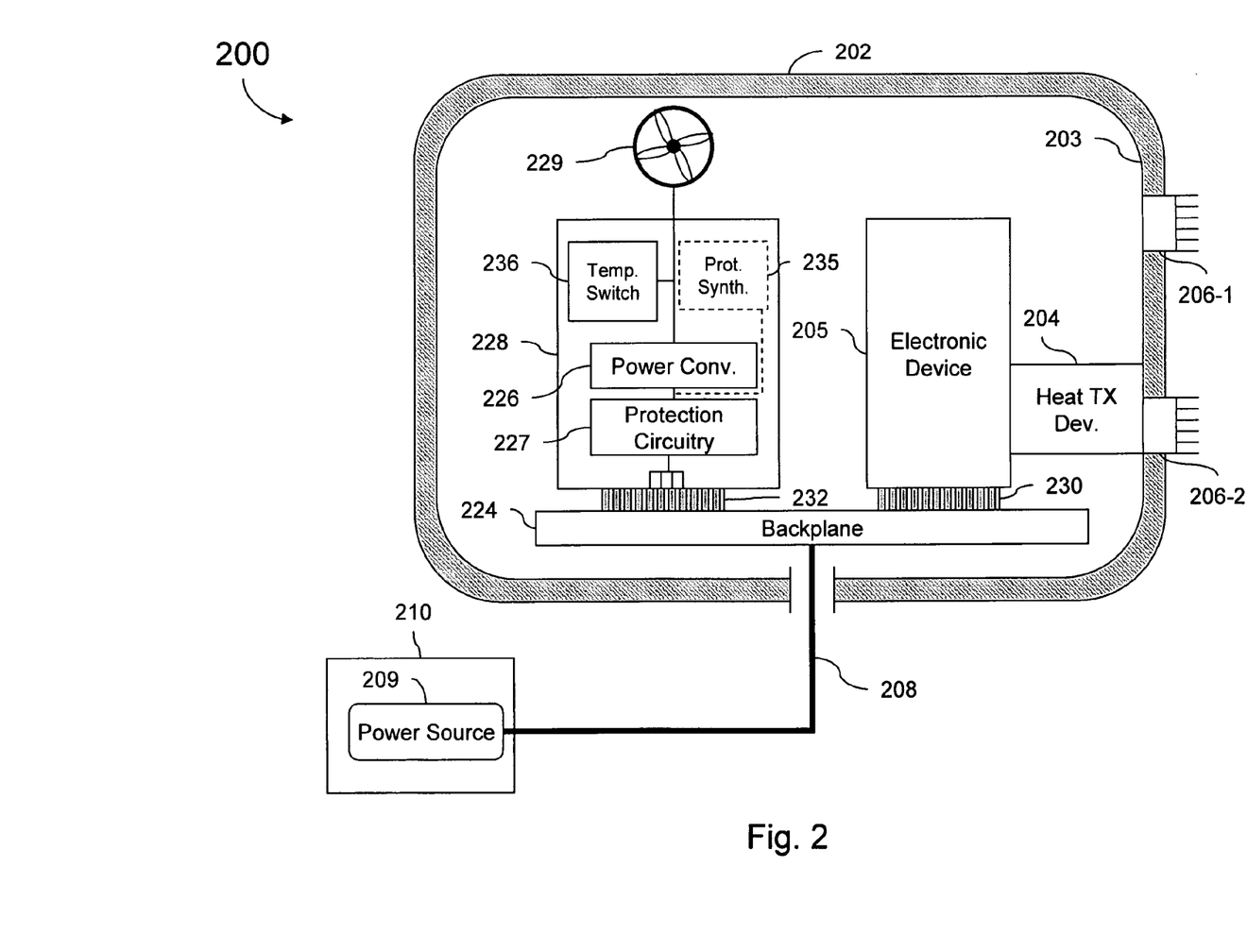
FIG. 2 is an illustration of an auxiliary cooling system of one embodiment of the present invention.

FIG. 2 is an illustration of one embodiment of an auxiliary cooling system generally shown at 200 according to the teachings of the present invention. System 200 includes a housing 202 for electronics equipment. In one embodiment, housing 202 is thermally conductive. In one embodiment, housing 202 is a metallic housing. In one embodiment, housing 202 comprises one or more passive heat transfer paths that transfer heat from one or more electronic devices such as electronic device 205 to an external environment through housing 202. In one embodiment, housing 202 includes one or more heat transfer paths such as heat transfer path 206-1 that transfers heat from the air within housing 202 to the external environment. In one embodiment, housing 202 includes one or more heat transfer paths such as heat transfer path 206-2 that transfers heat from one or more conductive heat transfer devices, such as heat transfer device 204. In one embodiment, heat transfer paths 206-1 and 206-2 comprise passive heat transfer devices such as but not limited to a heat sink that extends from the external environment through inside wall 203 of housing 202 and provides a heat transfer path for electronic devices such as electronic device 205. In one embodiment, heat transfer device 204 is coupled between electronic device 205 and a heat transfer path 206-2 and heat is transferred from electronic device 205 to heat transfer device 204 and then to heat transfer path 206-2 for further dissipation. In one embodiment, heat transfer device 204 comprises a cage into which one or more of electronic devices are mounted within. In one embodiment, heat transfer device 204 is part of the internal structure of housing 202. In one embodiment, heat transfer device 204 is any structure or component, either in direct contact with or not in contact with electronic devices 205, which is capable of transmitting heat away from electronic devices 205. In one embodiment, heat transfer path 206-2 is part of heat transfer device 204.

Housing 202 includes one or more heat producing electronic devices 205. In one embodiment, electronic devices 205 are coupled to a backplane 224 via an edge connector 230. In one embodiment, power is remotely provided to housing 202. In alternate embodiments, power is provided to housing 202 over span cable 208 from a network node 210. In one embodiment, network node 210 is a central office, remote terminal, or the like. In one embodiment, electronic devices 205 are powered through backplane 224 via edge connector 230. In one embodiment, electronic devices 205 include one or more telecommunications repeater devices.

Embodiments of the present invention provide additional heat removing capacity for housing 202 by including an auxiliary cooling systems 228 within housing 202 that improves the convective heat transfer from the surface of electronic devices 205 to the air within housing 202 and the convective heat transfer between the air within housing 202 and the inside wall 203 of housing 202 by circulating the air within housing 202 with a fan 229.

In one embodiment, in operation, fan 229 receives power over span cable 208 from at least one power source 209 via network node 210. In one embodiment, auxiliary cooling system 228 is coupled to span cable 208 via backplane 224. In one embodiment, auxiliary cooling system 228 includes optional protocol synthesizer 235, voltage protection 227 and power conversion circuitry 226 as described with respect to auxiliary cooling system 128 in FIG. 1B. In one embodiment, auxiliary cooling system 228 has the same form factor as the one or more electronic devices such as electronic device 205 and is powered through backplane 224 via edge connector 232.

In operation, fan 229 circulates air within housing 202. As would be appreciated by one skilled in the art upon reading this specification, the coefficient of heat transfer improves due to moving air. Auxiliary cooling system 228 improves the convective heat transfer from the surface of electronic devices 205 to air within housing 202 by circulating the relatively cooler air towards an exterior surface of electronic devices 205 and air heated by electronic devices 205 away from the exterior surface of electronic devices 205. Similarly, auxiliary cooling system 228 improves the convective heat transfer from air within housing 202 to one or both of inside wall 203 of housing 202 and heat transfer path 206-1 by circulating relatively warmer air towards inside wall 203 and air already cooled by inside wall 203 away from inside wall 203. In one embodiment, the operation of fan 229 is controlled by a temperature switch 236. In one embodiment, temperature switch 236 is a thermostat configured to energize fan 229 when temperatures within housing 202 reach a setpoint.

Figure 3A:
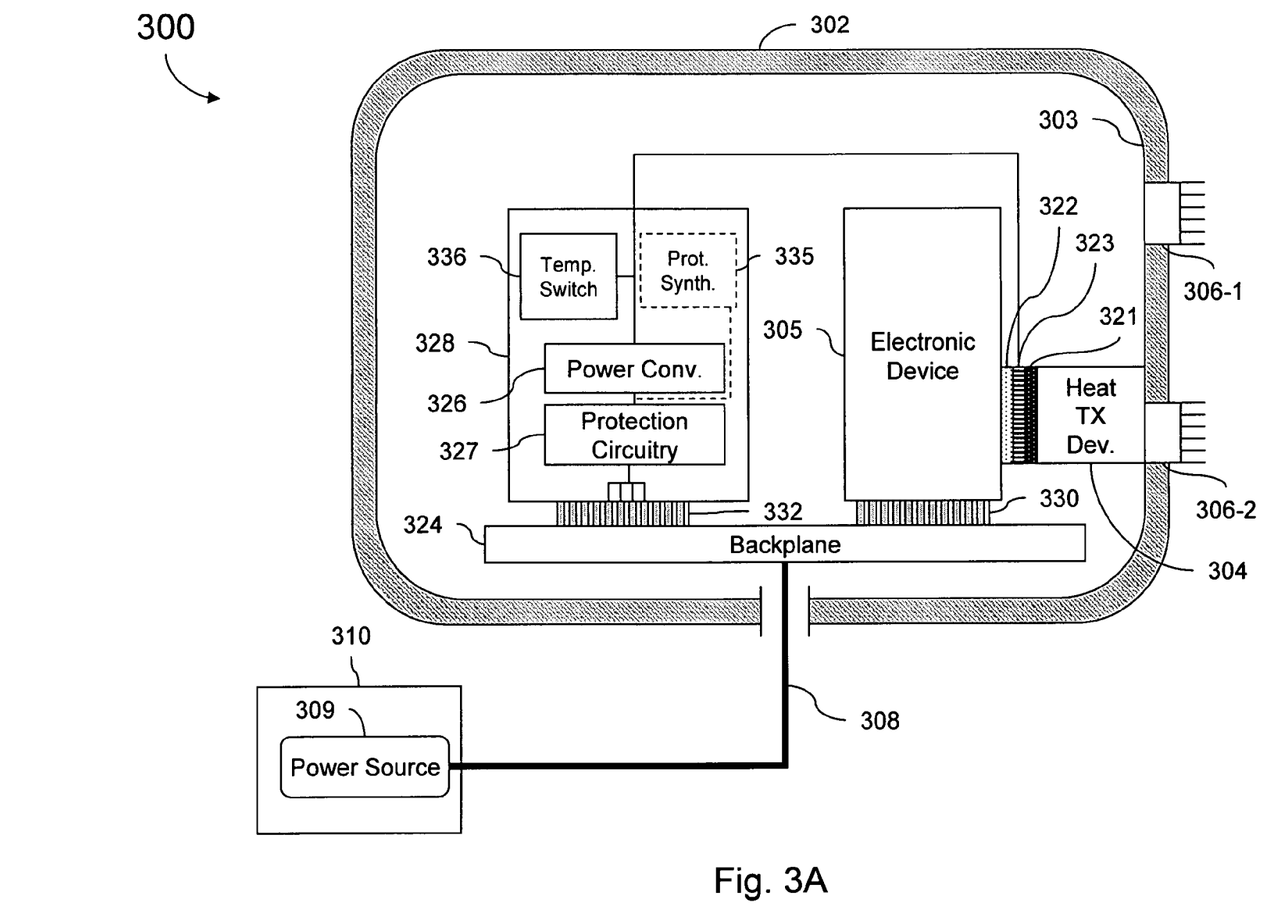
FIGS. 3A and 3B are illustrations of an auxiliary cooling system of one embodiment of the present invention.

FIG. 3A is an illustration of one embodiment of an auxiliary cooling system generally shown at 300 according to the teachings of the present invention. System 300 includes a housing 302 for electronics equipment. In one embodiment, housing 302 is thermally conductive. In one embodiment, housing 302 is a metallic housing. In one embodiment, housing 302 comprises one or more passive heat transfer paths that transfer heat from one or more electronic devices such as electronic device 305 to an external environment through housing 302. In one embodiment, housing 302 includes one or more heat transfer paths such as heat transfer path 306-1 that transfers heat from the air within housing 302 to the external environment. In one embodiment, housing 302 includes one or more heat transfer paths such as heat transfer path 306-2 that transfers heat from one or more conductive heat transfer devices, such as heat transfer device 304. In one embodiment, heat transfer paths 306-1 and 306-2 comprise a passive heat transfer devices such as but not limited to a heat sink that extends from the external environment through inside wall 303 of housing 302 and provides a heat transfer path for electronic devices such as electronic device 305. In one embodiment, heat transfer device 304 is coupled between electronic device 305 and a heat transfer path 306-2 and heat is transferred from electronic device 305 to heat transfer device 304 and then to heat transfer path 306-2 for further dissipation. In one embodiment, heat transfer device 304 comprises a cage into which one or more of electronic devices are mounted within. In one embodiment, heat transfer device 304 is part of the internal structure of housing 302. In one embodiment, heat transfer device 304 is any structure or component, either in direct contact with or not in contact with electronic devices 305, which is capable of transmitting heat away from electronic devices 305. In one embodiment, heat transfer path 306-2 is part of heat transfer device 304.

Housing 302 includes one or more heat producing electronic devices such as electronic device 305. In one embodiment, electronic device 305 is coupled to a backplane 324 via an edge connector 330. In one embodiment, power is remotely provided to housing 302. In alternate embodiments, power is provided to housing 302 over span cable 308 from a network node 310. In one embodiment, network node 310 is a central office, remote terminal, or the like. In one embodiment, electronic device 305 is powered through backplane 324 via edge connector 330. In one embodiment, electronic device 305 includes one or more telecommunications repeater devices.

Embodiments of the present invention provide additional heat removing capacity for housing 302 by including auxiliary cooling systems 328 within housing 302 that improves the conductive heat transfer between electronic devices 305 and inside wall 303 of housing 302 through one or more passive heat transfer devices 304 by pumping heat towards inside wall 303 using a thermoelectric cooling module 323. In one embodiment, in operation, thermoelectric cooling module 323 receives power over span cable 308 from at least one power source 309 via a network node 310. In one embodiment, auxiliary cooling system 328 is coupled to span cable 308 via backplane 324. In one embodiment, auxiliary cooling system 328 includes optional protocol synthesizer 335, voltage protection 327 and a power converter 326 as described with respect to auxiliary cooling system 128 in FIG. 1B. In one embodiment, auxiliary cooling system 328 has the same form factor as electronic device 305 and is powered through backplane 324 via edge connector 332.

Figure 3B:
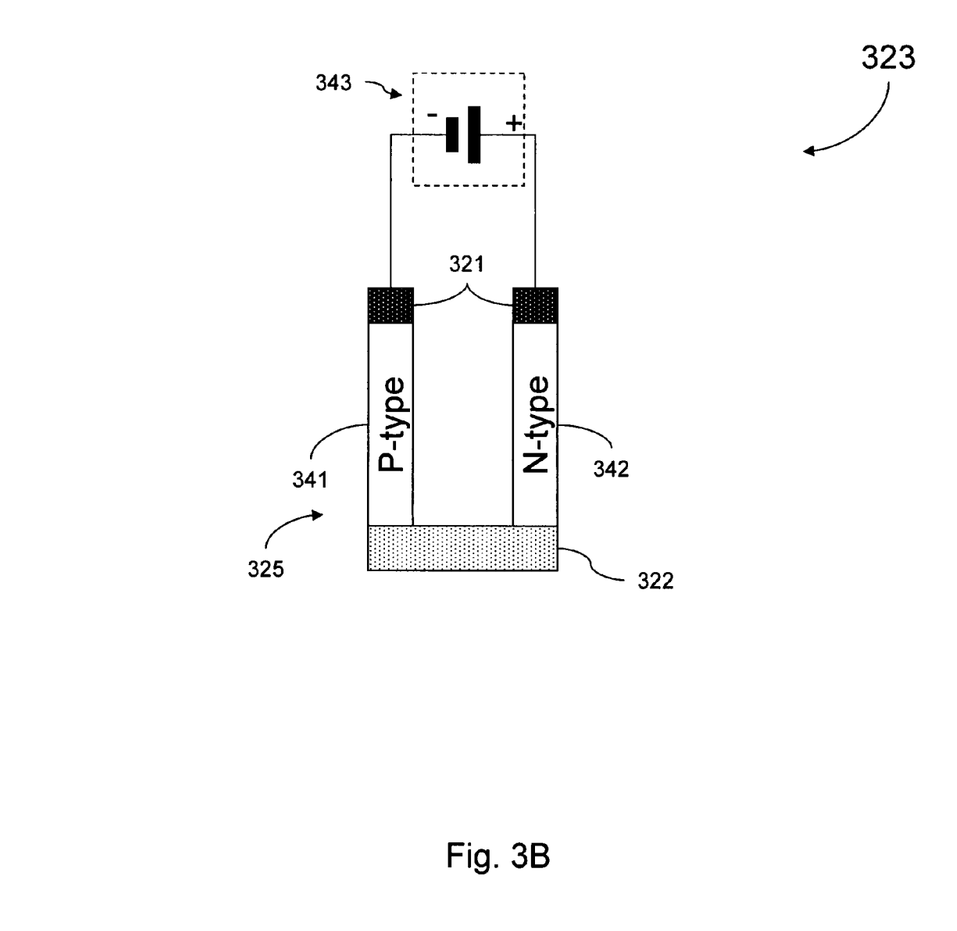

As would be appreciated by one skilled in the art upon reading this specification, a thermoelectric cooling module 323 performs as a solid state heat pump utilizing the thermoelectric phenomena known as the Peltier Effect, sometimes called the inverse Seebeck Effect, to provide cooling by applying electric current to one or more thermoelectric cooling elements 325 each comprised of a p-type semiconductor 341 and an n-type semiconductor 342 connected electrically in series and thermally in parallel as illustrated generally in FIG. 3B. As electrons move from p-type semiconductor 341 to n-type semiconductor 342 at cold junction 322, thermal energy is absorbed as the electrons move to a higher energy state. As electrons move from n-type semiconductor 342 to p-type semiconductor 341 at hot junction 321, thermal energy is release as the electrons move to a lower energy state. The temperature gradient from cold junction 322 to hot junction 321 will vary as a function of the current applied. In one embodiment, the required current is produced by providing a voltage potential (shown generally at 343) across p-type semiconductor 341 and n-type semiconductor 342. In one embodiment, voltage potential 343 is provided by power converter 326. In one embodiment, thermoelectric cooling module 323 is one of, but not limited to, a TEM series thermoelectric module manufactured by Ferrotec (USA) Corporation, a 98U001 thermoelectric cooling module as supplied by alltronics.com of Morgan Hill, Calif., or similar thermoelectric module.

In one embodiment thermoelectric cooling module 323 is mounted between electronic device 305 and passive heat transfer devices 304, with cold junction 322 coupled to electronic device 305 and hot junction 321 coupled to passive heat transfer device 304. In operation, auxiliary cooling system 328 improves the conductive heat transfer between electronic device 305 and inside wall 303 of housing 302 by drawing heat from electronic device 305 and transferring that heat into passive heat transfer device 304. The heat transferred by passive heat transfer devices 304 is absorbed by one or both of inside wall 303 of housing 302 and heat transfer path 306-2, and then dissipates into the external environment. In one embodiment, heat is transferred from electronic device 305 to thermoelectric cooling module 323, to heat transfer device 304 and then to heat transfer path 306-2 for further dissipation.

Figure 3C:
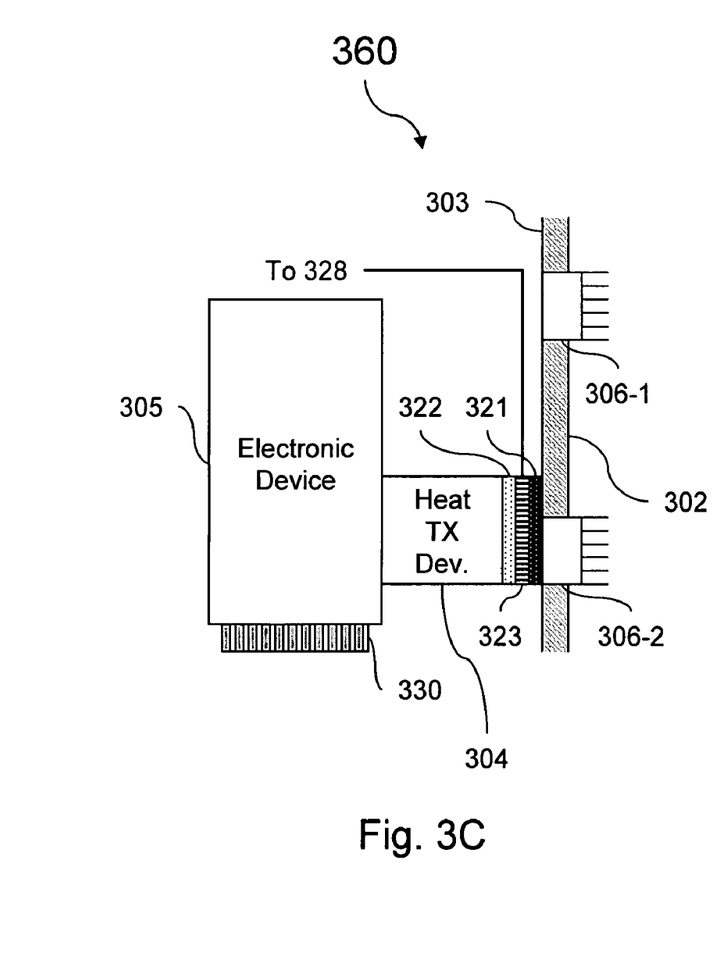
FIG. 3C is an illustration of an auxiliary cooling system of one embodiment of the present invention.

Alternatively, in one embodiment shown generally in FIG. 3C at 360, thermoelectric cooling module 323 is mounted between heat transfer device 304 and one or both of inside wall 303 and heat transfer path 306-2, with cold junction 322 coupled to passive heat transfer device 304 and hot junction 321 coupled to inside wall 303 (or alternatively coupled to heat transfer path 306-2). In operation, auxiliary cooling system 328 improves the conductive heat transfer between electronic device 305 and inside wall 303 of housing 302 by drawing heat absorbed by passive heat transfer device 304 from electronic devices 305 and transferring that heat into one or both of inside wall 303 and heat transfer path 306-2. The heat transferred into one or both of inside wall 303 and heat transfer path 306-2, then dissipates into the external environment. In one embodiment, the operation of thermoelectric cooling module 323 is controlled by a temperature switch 336. In one embodiment, temperature switch 336 is a thermostat configured to apply potential to thermoelectric cooling module 323 when temperatures within housing 302 reach a setpoint.

Figure 3D:
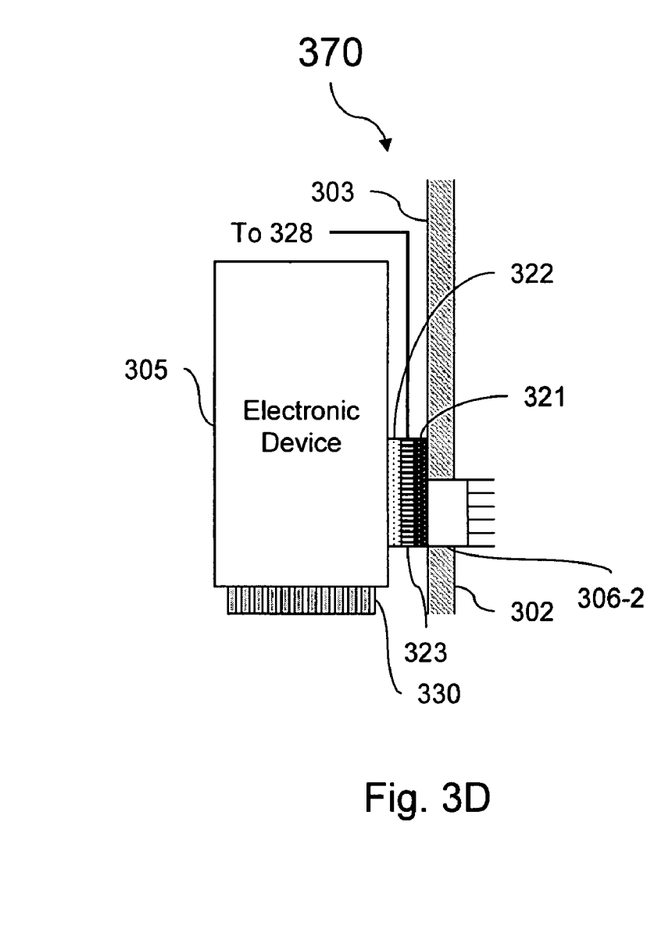
FIG. 3D is an illustration of an auxiliary cooling system of one embodiment of the present invention.

In one embodiment, shown generally in FIG. 3D at 370, thermoelectric cooling module 323 is mounted directly between electronic device 305 and one or both of inside wall 303 and heat transfer path 306-2, with cold junction 322 coupled to electronic device 305 and hot junction 321 coupled to inside wall 303 (or alternatively coupled to heat transfer path 306-2). In operation, auxiliary cooling system 328 improves the conductive heat transfer between electronic device 305 and inside wall 303 of housing 302 by drawing heat from electronic device 305 and transferring that heat into one or both of inside wall 303 and heat transfer path 306-2. In one embodiment, heat is transferred from electronic device 305 to thermoelectric cooling module 323, and then to on or both of inside wall 303 and heat transfer path 306-2 for further dissipation.

Figure 4A:
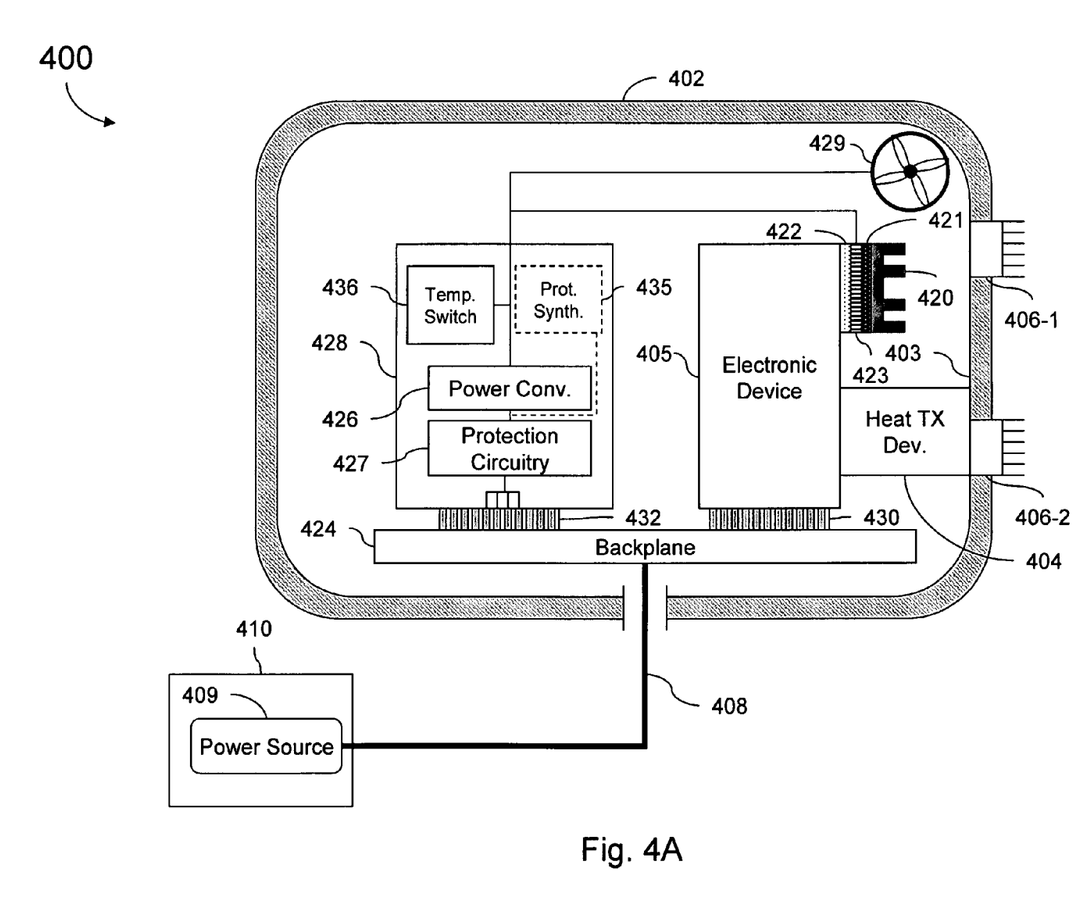
FIG. 4A is an illustration of an auxiliary cooling system of one embodiment of the present invention.
Figure 4B:
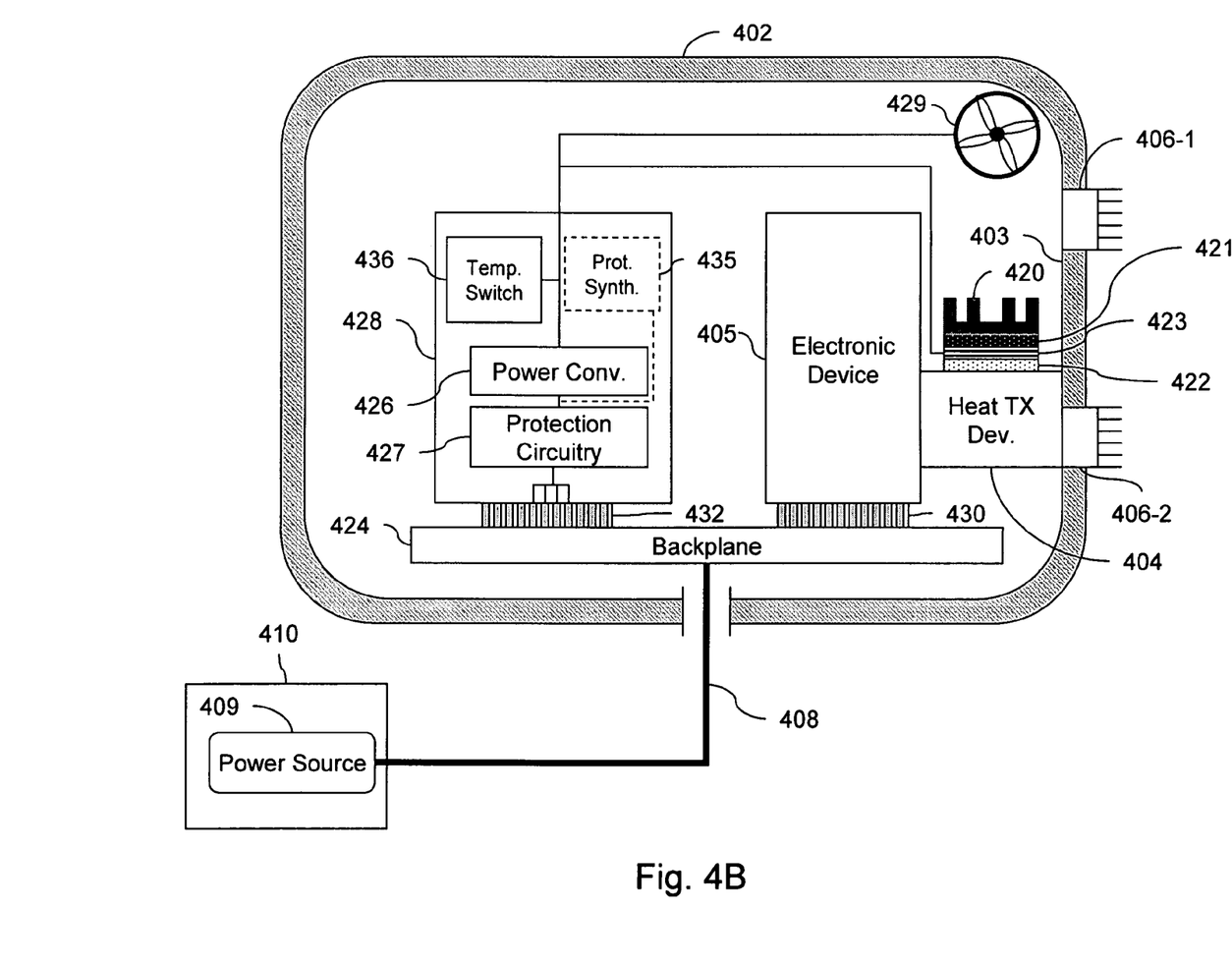
FIG. 4B is an illustration of an auxiliary cooling system of one embodiment of the present invention.

FIG. 4A is an illustration of another embodiment of an auxiliary cooling system generally shown at 400 according to the teachings of the present invention. System 400 includes a housing 402 for electronics equipment. In one embodiment, housing 402 is thermally conductive. In one embodiment, housing 402 is a metallic housing. In one embodiment, housing 402 comprises one or more passive heat transfer paths that transfer heat from one or more electronic devices such as electronic device 405 to an external environment through housing 402. In one embodiment, housing 402 includes one or more heat transfer paths such as heat transfer path 406-1 that transfers heat from the air within housing 402 to the external environment. In one embodiment, housing 402 includes one or more heat transfer paths such as heat transfer path 406-2 that transfers heat from one or more conductive heat transfer devices, such as heat transfer device 404. In one embodiment, heat transfer paths 406-1 and 406-2 comprise a passive heat transfer devices such as but not limited to a heat sink that extends from the external environment through inside wall 403 of housing 402 and provides a heat transfer path for electronic devices such as electronic device 405. In one embodiment, heat transfer device 404 is coupled between electronic device 405 and a heat transfer path 406-2 and heat is transferred from electronic device 405 to heat transfer device 404 and then to heat transfer path 406-2 for further dissipation. In one embodiment, heat transfer device 404 comprises a cage into which one or more of electronic devices are mounted within. In one embodiment, heat transfer device 404 is part of the internal structure of housing 402. In one embodiment, heat transfer device 404 is any structure or component, either in direct contact with or not in contact with electronic devices 405, which is capable of transmitting heat away from electronic devices 405. In one embodiment, heat transfer path 406-2 is part of heat transfer device 404.

Housing 402 includes one or more heat producing electronic devices such as electronic device 405. In one embodiment, electronic device 405 is coupled to a backplane 424 via an edge connector 430. In one embodiment, power is remotely provided to housing 402. In alternate embodiments, power is provided to housing 402 over span cable 408 from a network node 410. In one embodiment, network node 410 is a central office, remote terminal, or the like. In one embodiment, electronic devices 405 are powered through backplane 424 via edge connector 430. In one embodiment, electronic device 405 includes one or more telecommunications repeater devices.

Embodiments of the present invention provide additional heat removing capacity for housing 402 by including an auxiliary cooling systems 428 within housing 402 that improves the convective heat transfer from the surface of electronic device 405 to the air within housing 402 by pumping heat from the surface of electronic device 405 into a heat sink 420 via thermoelectric cooling module 423. In one embodiment, in operation, thermoelectric cooling module 423 receives power over span cable 408 from at least one power source 409 via network node 410. In one embodiment, auxiliary cooling system 428 is coupled to span cable 408 via backplane 424. In one embodiment, auxiliary cooling system 428 includes optional protocol synthesizer 435, protection circuitry 427 and a power converter 426 as described with respect to auxiliary cooling system 128 in FIG. 1B. In one embodiment, auxiliary cooling system 428 has the same form factor as electronic device 405 and is powered through backplane 424 via edge connector 432.

In one embodiment, thermoelectric cooling module 423 operates as discussed with respect to thermoelectric cooling module 323 as shown in FIG. 3B. In one embodiment, a cold junction 422 of thermoelectric cooling module 423 is mounted onto the surface of electronic device 405 while heat sink 420 is mounted onto a hot junction 421 of thermoelectric cooling module 423. In an alternate embodiment, illustrated in FIG. 4B, cold junction 422 of thermoelectric cooling module 423 is mounted onto the surface of heat transfer device 404 while heat sink 420 is mounted onto a hot junction 421 of thermoelectric cooling module 423. In operation, auxiliary cooling system 428 improves the convective heat transfer from the surface of electronic devices 405 to the air within housing 402 by drawing heat from electronic devices 405 and transferring that heat into heat sink 420. In one embodiment, the total surface area of heat sink 420 exposed to the air within housing 402 is greater than the interfacing area between thermoelectric cooling module 423 and electronic device 428. As would be appreciated by one skilled in the art upon reading this specification, heat sink 420 thus has a greater capacity for convectively dissipating heat into the air. Thus by pumping heat from electronic devices 405 into high surface area heat sink 420 through thermoelectric cooling module 423, convective heat transfer between electronic devices 405 and the air within housing 402 is improved.

In one embodiment, auxiliary cooling system 428 further comprises a fan 429 configured to circulate air within housing 402 in the vicinity of heat sink 420. As previously discussed with respect to FIG. 2, convective heat transfer improves when air within housing 402 circulates. The movement of air provided by fan 429 improves the convective heat transfer from the surface of heat sink 420 to the air within housing 402 by circulating air heated by heat sink 420 away from the surface of heat sink 420 and circulating the relatively cooler air towards the surface of heat sink 420.

In one embodiment, the operation of one or both of thermoelectric cooling module 423 and fan 429 is controlled by a temperature switch 436. In one embodiment, temperature switch 436 is a thermostat configured to apply potential to one or both of thermoelectric cooling module 423 and fan 429 based on the temperature within housing 402. In one embodiment temperature switch 436 turns on thermoelectric cooling module 423 when temperature within housing 402 reaches a first setpoint and turns on fan 429 when temperature within housing 402 reaches a second setpoint.

Figure 5:
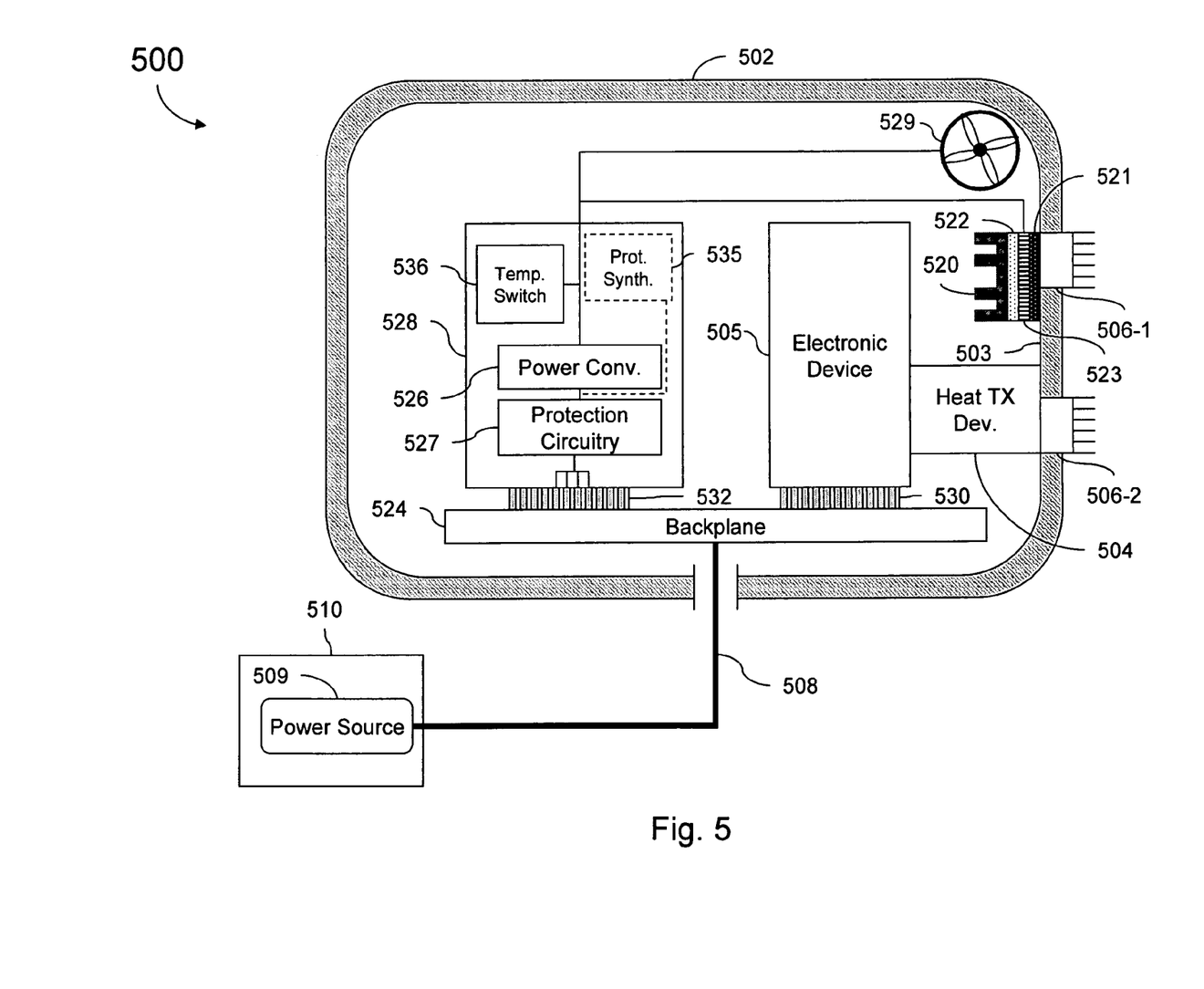
FIG. 5 is an illustration of an auxiliary cooling system of one embodiment of the present invention.

FIG. 5 is an illustration of another embodiment of an auxiliary cooling system generally shown at 500 according to the teachings of the present invention. System 500 includes a housing 502 for electronics equipment. In one embodiment, housing 502 is thermally conductive. In one embodiment, housing 502 is a metallic housing. In one embodiment, housing 502 comprises one or more passive heat transfer paths that transfer heat from one or more electronic devices such as electronic device 505 to an external environment through housing 502. In one embodiment, housing 502 includes one or more heat transfer paths such as heat transfer path 506-1 that transfers heat from the air within housing 502 to the external environment. In one embodiment, housing 502 includes one or more heat transfer paths such as heat transfer path 506-2 that transfers heat from one or more conductive heat transfer devices, such as heat transfer device 504. In one embodiment, heat transfer paths 506-1 and 506-2 comprise a passive heat transfer devices such as but not limited to a heat sink that extends from the external environment through inside wall 503 of housing 502 and provides a heat transfer path for electronic devices such as electronic device 505. In one embodiment, heat transfer device 504 is coupled between electronic device 505 and a heat transfer path 506-2 and heat is transferred from electronic device 505 to heat transfer device 504 and then to heat transfer path 506-2 for further dissipation. In one embodiment, heat transfer device 504 comprises a cage into which one or more of electronic devices are mounted within. In one embodiment, heat transfer device 504 is part of the internal structure of housing 502. In one embodiment, heat transfer device 504 is any structure or component, either in direct contact with or not in contact with electronic devices 505, which is capable of transmitting heat away from electronic devices 505. In one embodiment, heat transfer path 506-2 is part of heat transfer device 504.

Housing 502 includes one or more heat producing electronic devices such as electronic device 505. In one embodiment, electronic device 505 is coupled to a backplane 524 via an edge connector 530. In one embodiment, power is remotely provided to housing 502. In alternate embodiments, power is provided to housing 502 over span cable 508 from a network node 510. In one embodiment, network node 510 is a central office, remote terminal, or the like. In one embodiment, electronic devices 505 are powered through backplane 524 via edge connector 530. In one embodiment, electronic devices 505 include one or more telecommunications repeater devices.

Embodiments of the present invention provide additional heat removing capacity for housing 502 by including one or more auxiliary cooling systems 528 within housing 502 that improve the convective heat transfer from the air within housing 502 to inner wall 503 of housing 502 (or alternatively to heat transfer path 506-1) by pumping heat from a heat sink 520 into inner wall 503 of housing 502 via thermoelectric cooling module 523. In one embodiment, in operation, thermoelectric cooling module 523 receives power over span cable 508 from at least one power source 509 via network node 510. In one embodiment, auxiliary cooling system 528 is coupled to span cable 508 via backplane 524. In one embodiment, auxiliary cooling system 528 includes optional protocol synthesizer 535, protection circuitry 527 and a power converter 526 as described with respect to auxiliary cooling system 128 in FIG. 1B. In one embodiment, auxiliary cooling system 528 has the same form factor as electronic device 505 and is powered through backplane 524 via edge connector 532.

In one embodiment, thermoelectric cooling module 523 operates as discussed with respect to thermoelectric cooling module 323 as shown in FIG. 3B. In one embodiment, a hot junction 521 of thermoelectric cooling module 523 is mounted onto inner wall 503 of housing 502 while heat sink 520 is mounted onto a cold junction 522 of thermoelectric cooling module 523.

In operation, auxiliary cooling system 528 improves convective heat transfer by pumping heat from heat sink 520 into the inner wall 503 of housing 502. Heat sink 520 convectively absorbs heat from the air within housing 502. When power is applied to thermoelectric cooling module 523, heat within heat sink 520 is absorbed by cold junction 522 and transferred into inner wall 503 by hot junction 521. From there, the heat dissipates through housing 502 into the external environment. As thermoelectric cooling module 523 removes heat from heat sink 520, heat sink 520 cools, increasing its capacity for absorbing additional heat from the air within housing 502.

In one embodiment, auxiliary cooling system 528 further comprises a fan 529 configured to circulate air within housing 502 in the vicinity of heat sink 520. As previously discussed with respect to FIGS. 2 and 4, convective heat transfer improves when air within housing 502 circulates. The movement of air provided by fan 529 improves the convective heat transfer from the air within housing 502 to the surface of heat sink 520 by circulating air cooled by heat sink 520 away from the surface of heat sink 520 and circulating relatively warmer air towards the surface of heat sink 520.

In one embodiment, the operation of one or both of thermoelectric cooling module 523 and fan 529 is controlled by a temperature switch 536. In one embodiment, temperature switch 536 is a thermostat configured to apply potential to one or both of thermoelectric cooling module 523 and fan 529 based on the temperature within housing 502. In one embodiment temperature switch 536 turns on thermoelectric cooling module 523 when temperature within housing 502 reaches a first setpoint and turns on fan 529 when temperature within housing 502 reaches a second setpoint.

As would be appreciated by one skilled in the art upon reading this specification, multiple auxiliary cooling devices could be installed in a single housing, in any combination of the embodiments described in FIGS. 2-5, to increase the heat transfer capacity for a housing. As would be appreciated by one skilled in the art upon reading this specification, the cooling capacity provided by auxiliary cooling systems of embodiment of the present invention is a function of the power available from the power sources. For example, where a power source can supply 26 watts of power to an auxiliary cooling system comprising a thermoelectric cooling module with a 50% coefficient of performance, then that auxiliary cooling system can provide up to 13 watts of cooling for electronic devices within the housing. Where the electronic devices comprise typical HDSL style telecommunications repeater cards that each produce 7.2 watts of heat, the auxiliary cooling system can offset the heat generated by almost two repeater cards. The exact configuration of the auxiliary cooling system chosen for implementation also depends on the configuration of the electronic devices within the housing. For example, embodiments as described with respect to FIGS. 3A, 3D and 4A, are most suitable where there is a single electronic device within the housing that requires auxiliary cooling. In contrast, embodiments as described with respect to FIGS. 2, 3C, 4B, and 5 are most suited to provide cooling to multiple electronic devices because these embodiments remove heat from the air within the housing. Because this is intended to be an auxiliary cooling device, it is not necessary for the cooling device to solely account for the entire cooling demand of a housing.

Figure 6:
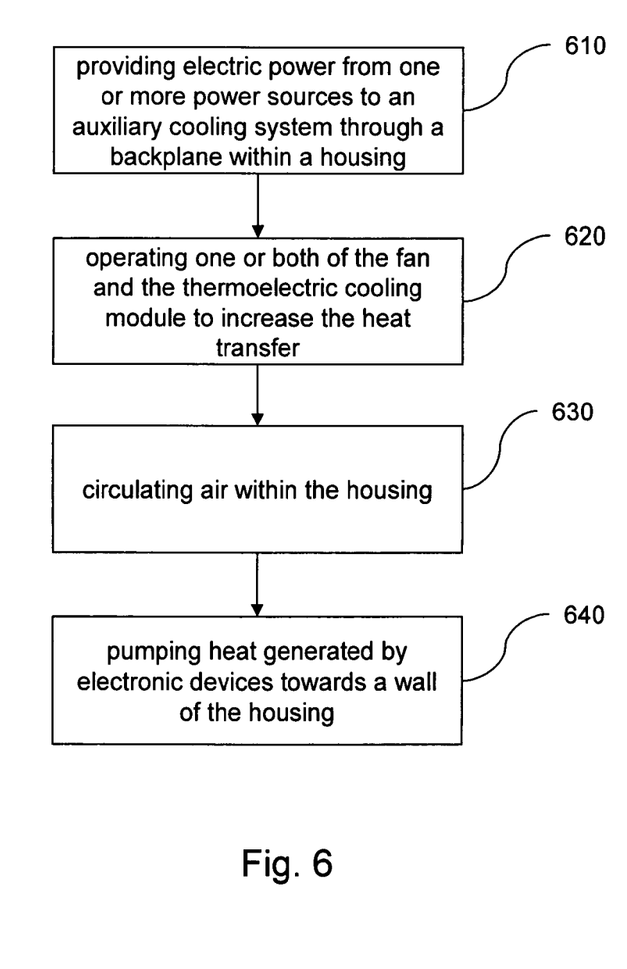
FIG. 6 is flow chart illustrating a method for auxiliary cooling of one embodiment of the present invention.

FIG. 6 is a flow chart illustrating one embodiment of a method for providing auxiliary cooling to a housing that encloses one or more electronic devices, according to the present invention. The method starts at 610 with receiving electric power from one or more power sources with an auxiliary cooling system. In one embodiment, power is received from the one or more power sources by an auxiliary cooling system through a backplane within a housing. In one embodiment, the auxiliary cooling system comprises one or both of a fan and a thermoelectric cooling module. In one embodiment, providing electric power further comprises coupling the backplane to a network node external to the housing through at least one span cable, wherein the one or more power sources are located within the network node. In one embodiment, the method optionally comprises converting power from the one or more power sources into a voltage usable to operate one or both of the thermoelectric cooling module and the fan, and protecting the auxiliary cooling system from at least one of short circuits, over-current, over-voltage, and polarity reversal.

The method continues at 620 with operating one or both of the fan and the thermoelectric cooling module to increase heat transfer from the one or more electronic devices to one or both of a wall of the housing and a heat transfer path to an external environment. In one embodiment, the method optionally comprises switching power to one or both of the fan and the thermoelectric cooling module based on a temperature within the housing. The method continues to one or both of 630 with circulating air within the housing, and 640 with pumping heat generated by electronic devices towards a wall of the housing. In one embodiment, the fan is configured to circulate air within the housing as described with respect to FIGS. 2 through 5 above. In one embodiment, the thermoelectric cooling module is configured to pump heat generated by the one or more electronic devices away from electronic devices and towards the wall of the housing as described in FIGS. 3 through 5 above.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An electronics device enclosure system, the system comprising:
  a housing, wherein the housing encloses one or more electronic devices;
  a backplane situated within the housing wherein at least one of the one or more electronic devices are coupled to the backplane; and
  an auxiliary cooling system coupled to the backplane and adapted to receive electrical power from one or more power sources, wherein the auxiliary cooling system comprises one or both of a thermoelectric cooling module and a fan, and wherein the auxiliary cooling system is adapted to increase the heat transfer from the one or more electronic devices to an environment external to the housing; and
  wherein the backplane is adapted to couple with telecommunication circuit repeater cards.

2. The system of claim 1, wherein one or more of the electronic devices and the auxiliary cooling system is coupled to the one or more power sources through at least one span cable.

3. The system of claim 2, further comprising:
  a network node external to the housing and coupled to the backplane by the at least one span cable, wherein the one or more power sources are located within the network node.

4. The system of claim 3, wherein the network node is one of a central office and a remote terminal.

5. The system of claim 3, wherein the auxiliary cooling system further comprises a protocol synthesizer that mimics a remote repeater and is adapted to receive power from the network node.

6. The system of claim 5, wherein the protocol synthesizer is adapted to provide one or more of:
  support for embedded operations channels (EOC) for maintenance and provisioning purposes;
  support for defining a unique address for the auxiliary cooling system such that one or more messages on an end-to-end EOC are distinguishable between any of one or more repeaters and the auxiliary cooling system;
  loop power through to one or both of a repeater housed in a separate housing and an auxiliary cooling system housed in a separate housing;
  DC continuity indication for shorts;
  power shut off when a non-compatible component is recognized;
  support for disabling loop power enabling when a fault is detected by the auxiliary cooling system and re-enabling loop power enabling when the fault is cleared; and
  support for a tone-through feature to allow tracing through the auxiliary cooling system when the auxiliary cooling system is not powered.

7. The system of claim 1, wherein the one or more power sources comprise one or more of a battery and a DC power source.

8. The system of claim 1, wherein the auxiliary cooling system further comprises:
  a card adapted to couple with the backplane;
  protection circuitry connected to the card and adapted to protect the auxiliary cooling system from at least one of short circuits, over-current, over-voltage, and polarity reversal; and
  at least one power converter connected to the card and adapted to convert power from the one or more power sources into a voltage usable to operate one or both of the thermoelectric cooling module and the fan.

9. The system of claim 8, wherein the auxiliary cooling system further comprises a temperature switch adapted to operate one or both of the thermoelectric cooling module and the fan based on the ambient temperature inside the housing.

10. The system of claim 1, wherein the one or more electronic devices comprise one or more telecommunication circuit repeater cards.

11. The system of claim 1, further comprising:
  a heat transfer device adapted to transfer heat produced by at least one of the one or more electronic devices to one or both of a wall of the housing and a heat transfer path to the environment external to the housing;
  wherein the thermoelectric cooling module is coupled to the heat transfer device and adapted to pump heat produced by the at least one of the one or more electronic devices into the heat transfer device.

12. The system of claim 1, further comprising:
a first heat transfer device adapted to transfer heat produced by at least one of the one or more electronic devices to the thermoelectric cooling module;
wherein the thermoelectric cooling module is coupled to the first heat transfer device and adapted to pump heat from the first heat transfer device to one or both of a wall of the housing and a heat transfer path adapted transfer heat to the environment external to the housing.

13. The system of claim 1, further comprising:
a heat sink mounted to a hot junction side of the thermoelectric cooling module, wherein a cold junction side of the thermoelectric cooling module is mounted to receive heat generated by at least one of the one or more electronic devices, and wherein the thermoelectric cooling module pumps heat produced by the at least one of the one or more electronic devices to the heat sink.

14. The system of claim 1, further comprising:
a heat sink mounted to a cold junction side of the thermoelectric cooling module, wherein the heat sink receives heat generated by the one or more electronic devices, wherein a hot junction side of the thermoelectric cooling module is mounted to the wall of the housing, and wherein the thermoelectric cooling module pumps heat received by the heat sink to one or more of the wall of the housing and a heat transfer path to the environment external to the housing.

15. An auxiliary cooling system for a housing enclosing one or more electronic devices, the system comprising:
a card adapted to couple with a backplane situated within the housing, wherein at least one of the one or more electronic devices are coupled to the backplane; and
one or both of a thermoelectric cooling module and a fan, wherein one or both of the thermoelectric cooling module and the fan are adapted to receive electrical power from one or more power sources;
wherein one or both of the thermoelectric cooling module and the fan are adapted to increase the heat transfer from the one or more electronic devices to an environment external to the housing; and
wherein the one or more electronic devices comprise one or more telecommunication circuit repeater cards.

16. The system of claim 15, wherein the auxiliary cooling system further comprises:
protection circuitry connected to the card and adapted to protect the auxiliary cooling system from at least one of short circuits, over-current, over-voltage, and polarity reversal; and
at least one power converter connected to the card and adapted to convert power from the one or more power sources into a voltage usable to operate one or both of the thermoelectric cooling module and the fan.

17. The system of claim 16, wherein the auxiliary cooling system further comprises a temperature switch adapted to operate one or both of the thermoelectric cooling module and the fan based on the ambient temperature inside the housing.

18. The system of claim 15, wherein the one or more power sources comprise one or more of a battery and a DC power source.

19. The system of claim 15, further comprising:
a heat sink mounted to a hot junction side of the thermoelectric cooling module, wherein a cold junction side of the thermoelectric cooling module is mounted to receive heat generated by at least one of the one or more electronic devices, and wherein the thermoelectric cooling module is adapted to pump heat produced by the at least one of the one or more electronic devices to the heat sink.

20. The system of claim 15, further comprising:
a heat sink mounted to a cold junction side of the thermoelectric cooling module, wherein the heat sink is adapted to receive heat generated by the one or more electronic devices, wherein a hot junction side of the thermoelectric cooling module is adapted for mounting to a wall of the housing, and wherein the thermoelectric cooling module is adapted to pump heat received by the heat sink to one or both of the wall of the housing and a heat transfer path to the environment external to the housing.

21. The system of claim 15, wherein the thermoelectric cooling module is adapted to pump heat produced by at least one of the one or more electronic devices to a heat transfer device.

22. The system of claim 15, wherein the thermoelectric cooling module is adapted to pump heat produced by at least one of the one or more electronic devices from a heat transfer device to one or both of a wall of the housing and a heat transfer path to the environment external to the housing.

23. A method to provide auxiliary cooling to a housing enclosing one or more electronic devices, the method comprising:
receiving power from one or more power sources with an auxiliary cooling system within a housing, wherein the housing encloses one or more electronic devices, and wherein the auxiliary cooling system comprises one or both of a fan and a thermoelectric cooling module; and
operating one or both of the fan and the thermoelectric cooling module to transfer heat away from the one or more electronic devices; and
wherein the auxiliary cooling system includes circuitry that mimics a remote repeater, and wherein the circuitry provides for one or more of:
supporting embedded operations channels (EOC) for maintenance and provisioning purposes;
supporting a definition of a unique address for the auxiliary cooling system such that the messages on an end-to-end EOC are distinguished between one or more repeaters and the auxiliary cooling system;
passing a loop power to one or both of a repeater housed in a separate housing and an auxiliary cooling system housed in the separate housing;
a DC continuity indication for shorts;
shutting off power when a non-compatible component is recognized;
supporting a capability to disable loop power enabling when a fault is detected by the auxiliary cooling system and re-enabling loop power enabling when the fault is cleared; and
supporting a tone-through feature to allow tracing through the auxiliary cooling system when the auxiliary cooling system is not powered.

24. The method of claim 23, further comprising one or both of:
circulating air within the housing; and
pumping heat generated by at least one of the one or more electronic devices away from the at least one of the one or more electronic devices and towards the wall of the housing using the thermoelectric cooling module.

25. The method of claim 24, wherein pumping heat generated by at least one of the one or more electronic devices comprises pumping heat produced by at least one of the one or more electronic devices through a heat transfer device to one or both of a wall of the housing and a heat transfer path to the environment external to the housing.

26. The method of claim 24, wherein pumping heat generated by at least one of the one or more electronic devices comprises pumping heat produced by at least one of the one or more electronic devices from a cold junction side of the thermoelectric cooling module to a heat sink mounted to a hot junction side of the thermoelectric cooling module.

27. The method of claim 23, further comprising:
protecting the auxiliary cooling system from at least one of short circuits, over-current, over-voltage, and polarity reversal.

28. The method of claim 23, further comprising:
converting power from the one or more power sources into a voltage usable to operate one or both of the thermoelectric cooling module and the fan.

29. The method of claim 23, further comprising:
switching power to one or both of the fan and the thermoelectric cooling module based on a temperature within the housing.

30. The method of claim 23, wherein providing electric power further comprises:
coupling the backplane to a network node external to the housing through at least one span cable, wherein the one or more power sources are located within the network node.

31. The method of claim 23, further comprising:
pumping heat received by a heat sink mounted to a cold junction side of the thermoelectric cooling module to a wall of the housing, wherein a hot junction side of the thermoelectric cooling module is mounted to the wall of the housing.

* * * * *